United States Patent [19]

Lawrey et al.

[11] Patent Number: 5,723,563
[45] Date of Patent: *Mar. 3, 1998

[54] SPANDEX ELASTOMERS

[75] Inventors: Bruce D. Lawrey, Charleston; Stephen D. Seneker, Sissonville, both of W. Va.

[73] Assignee: Arco Chemical Technology, L.P., Greenville, Del.

[*] Notice: The term of this patent shall not extend beyond the expiration date of Pat. No. 5,691,441.

[21] Appl. No.: 728,923

[22] Filed: Oct. 11, 1996

[51] Int. Cl.$^6$ .............................. C08G 18/10; C08G 18/48
[52] U.S. Cl. .............................. 528/61; 528/64; 528/76; 528/906
[58] Field of Search .............................. 528/61, 64, 906, 528/76

[56] References Cited

U.S. PATENT DOCUMENTS

| | | | |
|---|---|---|---|
| 3,180,854 | 4/1965 | Schneider et al. | 528/61 |
| 3,384,623 | 5/1968 | Inoue et al. | 528/49 |
| 3,393,243 | 7/1968 | Cuscurida | 568/620 |
| 3,427,256 | 2/1969 | Milgrom | 502/150 |
| 3,427,334 | 2/1969 | Belner | 556/31 |
| 3,427,335 | 2/1969 | Herold | 549/206 |
| 3,483,167 | 12/1969 | Sommer et al. | 528/49 |
| 3,829,505 | 8/1974 | Herold | 568/606 |
| 3,941,849 | 3/1976 | Herold | 528/92 |
| 3,963,681 | 6/1976 | Kaneko et al. | 528/61 |
| 4,098,772 | 7/1978 | Bonk et al. | 528/49 |
| 4,282,387 | 8/1981 | Olstowski et al. | 568/618 |
| 4,687,851 | 8/1987 | Laughner | 544/398 |
| 5,000,899 | 3/1991 | Dreibelbis et al. | 264/205 |
| 5,010,117 | 4/1991 | Herrington et al. | 521/159 |
| 5,010,187 | 4/1991 | Heuvelsland | 536/120 |
| 5,070,125 | 12/1991 | Heuvelsland | 528/57 |
| 5,077,371 | 12/1991 | Singh et al. | 528/64 |
| 5,096,993 | 3/1992 | Smith et al. | 528/61 |
| 5,106,874 | 4/1992 | Porter et al. | 528/64 |
| 5,114,619 | 5/1992 | Heuvelsland | 568/613 |
| 5,185,420 | 2/1993 | Smith et al. | 528/61 |
| 5,340,902 | 8/1994 | Smith et al. | 528/61 |
| 5,470,813 | 11/1995 | Le-Khac | 502/175 |
| 5,482,908 | 1/1996 | Le-Khac | 502/156 |
| 5,545,601 | 8/1996 | Le-Khac | 502/156 |
| 5,545,706 | 8/1996 | Barksby et al. | 528/49 |
| 5,563,221 | 10/1996 | Pazos | 525/409 |
| 5,589,431 | 12/1996 | Le-Khac | 502/175 |
| 5,616,676 | 4/1997 | Katsuo | 528/61 |
| 5,644,015 | 7/1997 | Seo et al. | 528/60 |
| 5,648,447 | 7/1997 | Seneker et al. | 528/63 |

OTHER PUBLICATIONS

Smith et al.; "Thermoplastic Polyurethane Elastomers Made from High Molecular Weight POLY-L Polyols"; Polyurethanes World Congress 1991; Sep. 26, 1991; pp. 313–318.

A.T. Chen et al., "Comparison of the Dynamic Properties of Polyurethane Elastomers Based on Low Unsaturation Polyoxypropylene Glycols and Poly(tetramethylene oxide) Glycols," Polyurethanes World Congress 1993, Oct. 10–13, 1993, pp. 388–399.

ASTM D-2849-69, "Testing Urethane Foam Polyol Raw Materials", pp. 913–931, 1969.

*Primary Examiner*—Rabon Sergent
*Attorney, Agent, or Firm*—Jonathan L. Schuchardt

[57] ABSTRACT

Spandex-type polyurethane/urea segmented elastomers with exceptional physical properties may be prepared by the aliphatic and/or cycloaliphatic diamine chain extension of a solution of isocyanate-terminated polyoxypropylene diol-derived prepolymer wherein the diol component comprises in major part an ultra-low unsaturation polyoxypropylene diol having an unsaturation of less than about 0.010 meq/g and a number average molecular weight greater than 2000 Da. The spandex polymers have commercially desirable percent set and are capable of exceeding the properties of the industry standard PTMEG elastomers in many respects, particularly in elongation and hysteresis.

21 Claims, 2 Drawing Sheets

SPANDEX ELASTOMERS

TECHNICAL FIELD

The present invention pertains to aliphatic diamine-extended polyurethane/urea spandex-type elastomers. More particularly, the present invention pertains to aliphatic diamine-extended polyurethane/urea spandex-type elastomers prepared from prepolymers derived from ultra-low unsaturation, high molecular weight polyoxyalkylene diols. The spandex elastomers exhibit surprisingly superior physical properties as compared to those prepared from conventional or from low unsaturation polyoxypropylene diols, or from polytetramethylene ether glycol (PTMEG), the industry standard.

BACKGROUND ART

Polyurethane/urea elastomers in the form of fibers and films have found wide acceptance in the textile industry. The term "spandex", often used to describe these elastomers, refers to long chain synthetic polymers comprised of at least 85% by weight of segmented polyurethane. The term "elastane" is used in Europe. Spandex fibers are used for many different purposes in the textile industry, especially in underwear, form-persuasive garments, bathing wear, and elastic garments or stockings. The elastomeric fibers may be supplied as core spun elastomer yarns spun round with filaments or staple fiber yarns, or as staple fiber admixture to non-elastic fibers for the purpose of improving the wearing qualities of fabrics which are not in themselves highly elastic.

In the past, natural rubber thread was the only material available to provide elasticity to fabrics. Spandex, originally developed in the 1950s, has numerous advantages over rubber filaments. The most important of these is its higher modulus. Typically, for a given denier, spandex has at least twice the recovery, or retractive power, of rubber. This enables stretch garments to be manufactured containing less elastic fiber and thus be lighter in weight. Additional advantages over natural rubber include the ability to obtain spandex in much finer deniers, higher tensile strength and abrasion resistance, and in many cases, higher resilience. Additionally, spandex exhibits improved resistance to many cosmetic oils, to solvents, for example those used in dry cleaning, and a high resistance to oxidation and ozone as well. Furthermore, in contrast to rubber filaments, spandex fibers can be dyed relatively easily with certain classes of dye-stuffs.

However, two areas where spandex fibers are inferior to rubber filaments are elongation and mechanical dynamic properties. Spandex fibers typically break at elongations of 500% while rubber filaments have elongations at break of 600 to 700%. In addition, rubber exhibits much lower hysteresis than spandex fibers. Hysteresis is a measure of the energy loss during stretching and retraction of an elastic material. A large energy loss implies heat generation and thus discomfort in wear. So there is a need in the industry for an elastic fiber with both the positive features of spandex such as high retractive power and the positive features of rubber such as high elongation and low hysteresis.

Another important physical property of elastic fibers is the "percent set" or "percent residual elongation," a measure of the fiber's ability to be stretched and then return to its original length. Any excess length is measured as percent set or residual elongation, and low values are desirable. Typical percent sets of PTMEG-derived spandex fibers are less than 30 percent, preferably less than 25 percent. It is particularly desirable to develop an elastic fiber with the positive features of PTMEG-derived spandex such as high retractive power, the positive features of rubber such as high elongation and low hysteresis, while retaining a low percent set.

The preparation of polyurethane elastomers by the polyaddition process from high molecular weight, substantially linear polyhydroxy compounds, polyisocyanates and chain lengthening agents which have reactive hydrogen atoms by reaction in a highly polar organic solvents is already known. The formation of fibers, filaments, threads, and films from these solvent-borne polyurethane elastomers is also known. Reference may be made to U.S. Pat. Nos. 3,483,167 and 3,384,623, which illustrate the preparation of spandex fibers from isocyanate-terminated polymeric diol-derived prepolymers.

In commercial practice, the preferred polymeric diol is polytetramethylene ether glycol (PTMEG). It has been known for some time that in principle, polyoxypropylene glycol (PPG) could also be used to prepare spandex fibers. U.S. Pat. No. 3,180,854, for example, discloses a polyurethane/urea fiber based on a 2000 Da molecular weight polyoxypropylene glycol. However, spandex based on polyoxypropylene glycols of 2000 Da molecular weight or lower have inferior percent sets. Higher molecular weight polyoxypropylene glycols made by conventional processes contain high percentages of terminal unsaturation or monofunctional hydroxyl-containing species ("monol"). The monol is believed by many to act as a chain terminator, limiting the formation of the required high molecular weight polymer during the chain extension reaction and therefore yielding products generally inferior in comparison to PTMEG derived elastomers. However, the role of monol as a chain terminator may be over-simplified, as several patents, e.g. U.S. Pat. Nos. 3,384,623 and 4,098,772 disclose preparation of elastomers with enhanced physical properties by purposeful addition of monol to polyurethane elastomer formulations, and in the case of spandex-type, diamine extended polyurethane/urea elastomers, it is generally necessary to add chain terminators to limit polymer molecular weight and solution viscosity.

Thus, the properties of polyoxypropylene-derived spandex are generally inferior to those based on PTMEG, and polyoxypropylene glycols have not been utilized commercially in spandex production. See, e.g., the POLYURETHANE HANDBOOK (Gunther Oertel, Ed., Carl Hanser Verlag Pub., Munich 1985, p. 578: "Polypropylene glycols have so far been used as soft segments only in experimental products since they produce inferior elastanes"

The majority of polyoxyalkylene polyether polyols are polymerized through base catalysis. For example, polyoxypropylene diols are prepared by the base catalyzed oxypropylation of a difunctional initiator such as propylene glycol. During base catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17–21. Unsaturation is measured in accordance with ASTM D-2849-69 "Testing Urethane Foam Polyol Raw Materials," and expressed as milliequivalents of unsaturation per gram of polyol (meq/g).

Due to the continual creation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4000 Da molecular weight, the content of monofunctional species may lie between 30 and 40 mol percent. In such cases, the average functionality is lowered to c.a. 1.6 to 1.7 from the nominal, or theoretical functionality of 2.0. In addition, the polyols have a high polydispersity, $M_w/M_n$ due to the presence of the substantial, low molecular weight fractions. Molecular weights and equivalent weights herein in Da (Daltons) are number average molecular weights and number average equivalent weights, respectively, unless specified otherwise.

Lowering unsaturation and the attendant high monol fraction in polyoxypropylene polyols has been touted as a means of providing polyurethane elastomers with improved properties. For example, use of polyols having low content of monofunctional species has been suggested as a method of increasing polymer molecular weight; and increased polymer molecular weight has, in turn, sometimes been cited as desirable in producing higher performance polymers. However, high molecular weight is not necessarily a desirable feature in many polymer systems. As indicated by G. Odian, PRINCIPLES OF POLYMERIZATION, John Wiley & Sons, © 1981, pp. 20–21, for example, often, the molecular weight to be desired is a moderate rather than a high molecular weight. In engineering thermoplastics, for example, higher molecular weights in general increase tensile strength, melt temperature, modulus, and the like, but if the molecular weight is too high, polymer viscosity becomes too great to process. In polyurethanes, molecular weights are far lower than engineering thermoplastics, and polymer morphology and physical properties are influenced by many factors, including amount and nature of hard segment, stereochemistry of isocyanate used, etc. Often, formulations must be chosen to balance conflicting properties. For example, increases in tensile strength are often accompanied by a decrease in elongation, and in the spinning of fibers from polymer solutions, high molecular weights frequently result in high viscosity solutions which are not spinnable without reducing solids content.

Reducing unsaturation in polyoxyalkylene polyols by lowering catalyst concentration and decreasing the reaction temperature is not feasible, as the reaction rate is so slow that oxypropylation takes days or even weeks, although low unsaturation polyols may be prepared in this manner. Thus, efforts have been expended to discover catalysts which can produce polyoxypropylated products in a reasonable amount of time with little introduction of monofunctionality due to allylic species. In the early 1960's, for example, double metal cyanide catalysts such as zinc hexacyanocobaltate Complexes were developed as illustrated by U.S. Pat. Nos. 3,427,256; 3,427,334; 3,427,335; 3,829,505; and 3,941,849. Despite lowering unsaturation to the range of c.a. 0.018 meq/g, the cost of these catalysts coupled with the necessity of lengthy and expensive catalyst removal steps prevented commercialization.

Use of alternative basic catalysts such as cesium hydroxide and rubidium hydroxide as disclosed in U.S. Pat. No. 3,393,243, and the barium and strontium oxides and hydroxides, as disclosed in U.S. Pat. Nos. 5,010,187 and 5,114,619, enabled modest improvements in unsaturation, however catalyst expense, and in some cases, toxicity, coupled with the but modest improvements offered, mitigated against commercialization. Catalysts such as calcium naphthenate and combinations of calcium naphthenate and tertiary amines have proven successful, as disclosed in U.S. Pat. Nos. 4,282,387, 4,687,851 and 5,010,117, in preparing polyols with unsaturations as low as 0.016 meq/g, and more generally in the range of 0.02 to 0.04 meq/g.

In the 1980's, double metal cyanide complex (DMC) catalysts were once more revisited, and improvements in catalytic activity and catalyst removal methods encouraged one manufacturer to offer DMC catalyzed polyols having low unsaturations, i.e., in the range of 0.015 to 0.018 meq/g commercially for a brief time. However, base catalysis continued to be the major method of preparing polyoxypropylene polyols, and continues its dominance to the present day.

Recently, however, further major advances in DMC catalysts and polyoxyalkylation processes by the ARCO Chemical Co. have enabled practical preparation of ultra-low unsaturation polyoxypropylene polyols. High molecular weight polyols, for example those in the 4000 Da to 8000 Da molecular weight range, typically exhibit unsaturation in the range of 0.004 to 0.007 meq/g when catalyzed by the novel DMC catalysts. At these levels of unsaturation, the amount of monofunctional species is only 2 mol percent or less. Moreover, GPC analysis shows the polyols to be virtually monodisperse, often exhibiting polydispersities less than 1.10. Several such polyols have recently been commercialized as ACCLAIM™ polyols. The ultra-low unsaturation polyols have been found to be quantitatively different than both conventional polyols and low unsaturation polyols.

For example, Smith et al. U.S. Pat. No. 5,340,902 discloses spandex fibers prepared from polyoxypropylene diols having low unsaturation, less than 0.03 meq/g. Use of low unsaturation polyoxypropylene diols is stated therein to allow preparation of fibers with properties superior to PTMEG-derived spandex fibers. However, all the examples appear to be prophetic, and no physical properties are given. Moreover, as illustrated herein in Comparative Example C-1, 4000 Da polyoxypropylene glycols having an unsaturation of 0.015 meq/g as suggested for use by Smith in his "examples," lead to inferior spandex elastomers, and 2000 Da molecular weight ultra-low unsaturation polyoxypropylene glycols having an unsaturation of 0.0047, a much lower monol content than Smith's low unsaturation glycols, also failed to produce acceptable spandex elastomers. Reference may be had to Comparative Example C-3 in this regard. In the substantially contemporaneous publication co-authored by Smith: A. T. Chen et al., "Comparison of the Dynamic Properties of Polyurethane Elastomers Based on Low Unsaturation Polyoxypropylene Glycols and Poly(tetramethylene oxide) Glycols," POLYURETHANES WORLD CONGRESS 1993, Oct. 10–13, 1993, pp. 388–399, conventional, base-catalyzed polyoxypropylene diols having normal (high) levels of unsaturation produced polyurethane/urea cast elastomers with physical properties virtually indistinguishable from those prepared from low unsaturation diols, as demonstrated by an actual comparison of physical properties of PTMEG-derived elastomers with those from conventional polyoxypropylene diols and low unsaturation polyoxypropylene diols. In Shore A 90 cast elastomers, PTMEG-MDI prepolymer-derived, butanediol-extended polyurethane elastomers had slightly lower modulus and elongation than low unsaturation polyoxypropylene diol-derived elastomers, however tensile strength of the PTMEG elastomers was considerably higher. For polyurethane/urea cast elastomers, a direct comparison was not possible, as the only PTMEG example used a 1000 Da PTMEG while both low unsaturation polyoxypropylene diol examples employed c.a. 2000 Da molecular weight diols. The PTMEG example had considerably higher physical properties with the exception of elongation, which was lower as expected due to the lower soft segment molecular weight. These results must be viewed with caution, however, as it is known that the physical properties of spandex-type elastomers cannot be compared to cast or one shot elastomers.

PTMEG is a solid at room temperature and yields MDI prepolymers of extremely high viscosity. Additionally, the spandex produced with PTMEG has relatively low elongation, about 500%, and exhibits high hysteresis in comparison to rubber. Yet, despite the inherent difficulties of handling PTMEG and the unsatisfactory elongation and hysteresis, PTMEG continues to be the mainstay of spandex production.

Heretofore, it had been believed that the increases in physical properties of spandex-type polyurethane/urea elastomers obtained through use of low unsaturation polyoxypropylene polyols, i.e. those with unsaturations of c.a. 0.015 meq/g, had been maximized, and that little further improvement was possible. The reason for this belief was due to the fact that monofunctional species, i.e. monols or monoamines, are generally added to the solution-processed, isocyanate-terminated prepolymers during diamine chain extension to limit the molecular weight of the polyurethane/ urea elastomer and hence the spinning solution viscosity. Thus, obtaining a product of exceptionally high molecular weight is not a goal, and the further elimination of unsaturation with its attendant higher functionality was thought not to affect the final polymer, only shifting molecular weight limitation from prepolymer formation to polymer formation.

Figure 1:
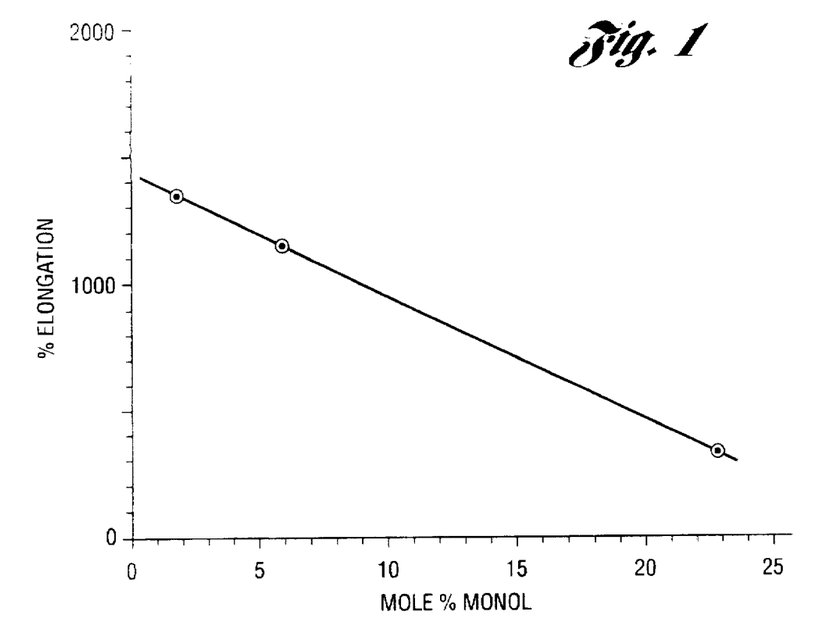
FIG. 1 illustrates the relationship elastomer elongation to mole percent monol.
Figure 2:
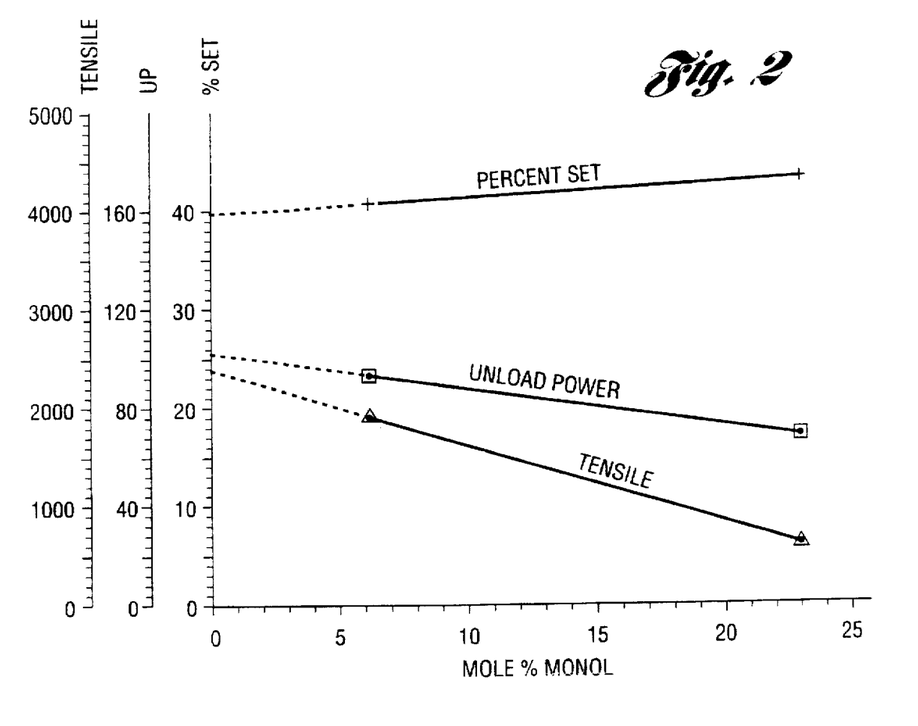
FIG. 2 illustrates the expected extrapolated values of percent set, unload power, and tensile strength relative to unsaturation based on the relationship of elongation to unsaturation.

Examination of percent elongation of spandex elastomers would appear to support this hypothesis. As illustrated by FIG. 1, spandex fiber elongation increases markedly when employing low unsaturation polyoxypropylene diols as compared to elongation of spandex prepared from conventional diols. The conventional diol, at 4000 Da molecular weight, contains approximately 23% monol, calculated from the content of unsaturation. The low unsaturation diol contains only about 6% monol. The increase in elongation is exceptional, rising from 310% to 1170%. The higher elongation allows such elastomers to exhibit elongation superior to that of spandex-type PTMEG-derived elastomers for the first time. Unfortunately, although tensile strength of low-unsaturation diol-derived spandex is measurably increased, unload power increased only marginally, and percent set, one of the most important elastomer properties, remained virtually unchanged. Moreover, these properties are significantly inferior to PTMEG-based spandex. Thus, it may be predicted that for ultra-low unsaturation diol-derived spandex elastomers, only a very minor additional increase in physical properties should be expected. Thus, elongation would be expected to increase marginally, and percent set would still be expected to be higher than the commercially acceptable limit. Elongation was indeed found to follow this pattern, being linearly and inversely related to monol content. Extending the unload power, tensile strength, and percent set properties in the same manner, as shown by the dashed lined extrapolation of FIG. 2, illustrates the very modest degree of improvement expected. Most noteworthy, the expected percent set is still very high, at 37%. Thus, it was thought that polyoxypropylene diol-based spandex, even with the ultra-low unsaturated polyoxypropylene diols newly made available, would not meet minimal commercial standards.

It would be desirable to provide spandex elastomers improved physical properties, particularly with respect to elongation, tensile strength, hysteresis, and percent set, while maintaining other physical properties. It would be yet further desirable to provide spandex elastomers based on less expensive and easier to handle polyoxypropylene glycols which exhibit truly improved properties as compared to PTMEG-based elastomers, rather than exhibiting properties which are merely similar. It would be still further desirable to provide prepolymers of high molecular weight but which display low neat and polymer solution viscosities so as to allow for higher solids content in spinning solutions, enabling higher throughput.

SUMMARY OF THE INVENTION

It has now been surprisingly discovered that the preparation of spandex elastomers from isocyanate-terminated prepolymers derived from a polyol component comprising in most major part, one or more ultra-low unsaturation polyoxypropylene glycols having molecular weights greater than 2000 Da, results in astounding improvements in tensile strength, percent set, recovery power, and hysteresis, while showing modest but significant improvement in elongation as compared to otherwise similar spandex based on low monol polyoxypropylene glycols. The dramatic increase in physical properties through use of ultra-low unsaturation polyoxypropylene glycols is particularly surprising in view of the fact that amine-cured cast elastomers based on low unsaturation polyols disclosed in the prior art show virtually no improvement in physical properties as compared to elastomers prepared from conventional, "high" unsaturation polyols.

Figure 4:
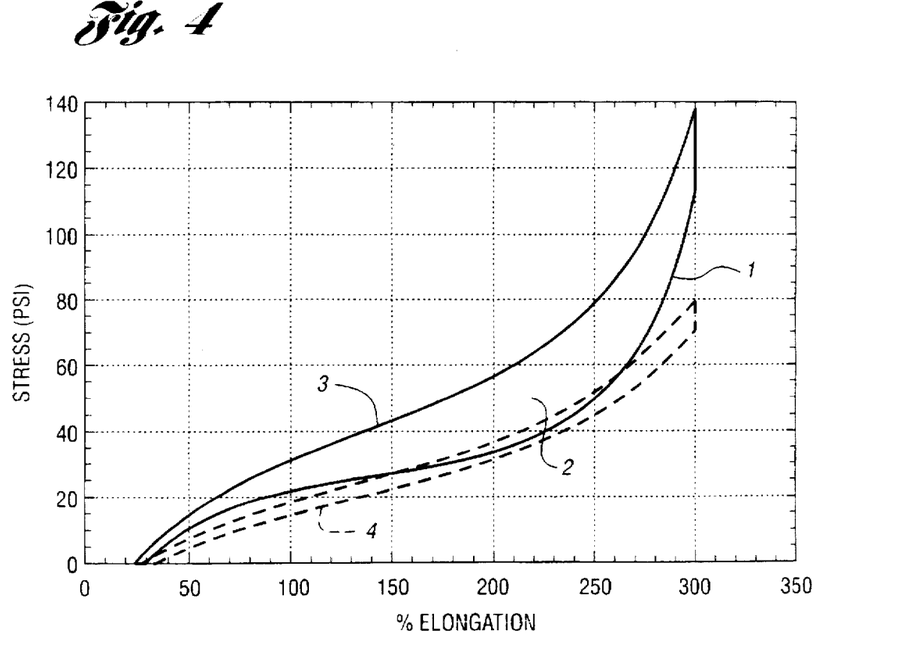
FIG. 4 compares the hysteresis curves of a PTMEG derived spandex with a spandex of the subject invention.

The subject invention spandex elastomers also provide dramatic improvements in elongation and hysteresis as compared with PTMEG-derived spandex materials. In addition, and as illustrated in FIG. 4, the stretch resistance (load power) of the subject invention spandex is lower than PTMEG-derived spandex, which translates to greater comfort and easier to don garments which are also easier to move in. Yet, at the same time, the subject invention spandex exhibits low hysteresis and high retractive (unload) power. Moreover, the novel prepolymers display lower prepolymer viscosities as well as lower polymer solution viscosities than PTMEG-derived polymer solutions of the same solids content. This lower solution viscosity allows the solids content to be raised while remaining processable, thereby increasing fiber throughput.

DESCRIPTION OF THE PREFERRED EMBODIMENT

The spandex-type elastomers of the subject invention must be prepared by a prepolymer process. In such processes, a polyol component, generally composed essentially of diols, is reacted with an excess of diisocyanate, to yield an isocyanate-terminated prepolymer containing a relatively low isocyanate content. Isocyanate contents of from 0.5–10%, preferably from 2–4%, are preferred. The prepolymers are then chain extended in solution with an aliphatic or cycloaliphatic diamine to form the final elastomer. Extrusion of the prepolymer into a water bath containing a diamine chain extended is sometimes used, as the diamine is far more reactive than water. Solvents other than water may be used as well, e.g. toluene.

Spandex elastomers prepared by chain extension in solution using isocyanate-terminated prepolymers or by the reactive spinning process cannot be compared with elastomers prepared by one-shot or quasi-prepolymer processes, as both of the latter introduce a significant amount of randomness in the polymer structure. Furthermore, neat processes cannot be used with aliphatic and cycloaliphatic diamines as the reactivity of these diamines is far too fast. The unusual strength and elongation properties of spandex-type elastomers are believed due to the uniform distribution of hard segments within the polymer matrix and to the very polar aliphatic urea hard segments they contain. These hard segments are believed to interact with one another through hydrogen bonding and, in some cases, crystallinity, and behave like cross-links or reinforcing fillers. Those skilled in the art of spandex polymers are aware of the processes used to prepare such. Reference may be made, for example, to U.S. Pat. Nos. 3,384,623; 3,483,167; and 5,340,902, which are herein incorporated by reference.

In the commercial production of spandex fibers by spinning from aprotic solvent, solvent removal is the rate limiting step. Due to the high viscosity of PTMEG-derived polymer solutions, solution solids are generally limited to a maximum of 25–30 weight percent or thereabouts, and thus considerable solvent must be removed from the spun fibers. Polar aprotic solvents tend to have relatively low volatility, and thus removal of some 70–75% of solvent from the spun fiber strands is a real impediment to increased fiber production rate. It has surprisingly and unexpectedly been found that polymer solution viscosities of ultra-low unsaturation polyoxypropylene-derived spandex are much lower than solution viscosities of PTMEG-derived polymers. Moreover, in at least one case, the spandex polymer of the subject invention exhibited lower solution viscosity even though having a molecular weight approximately 30% higher than the PTMEG-derived polymer.

Both aliphatic and aromatic di- and polyisocyanates may be used to prepare the spandex prepolymers. In general, diisocyanates are preferred, however it is within the scope of the invention to include a minor amount, i.e., not more than approximately 20 mol percent, of a tri- or higher-functionality isocyanate. Preferred isocyanates are identified in the references previously cited, and by way of example, but not by way of limitation, include linear aliphatic isocyanates such as 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2, 2,4-trimethylpentane, 3-oxo-1,5-pentane diisocyanate, and the like; cycloaliphatic diisocyanates such as isophorone diisocyanate, the cyclohexane diisocyanates, preferably 1,4-cyclohexane diisocyanate, fully hydrogenated aromatic diisocyanates such as hydrogenated tetramethylxylylene diisocyanate, hydrogenated toluene diisocyanates, and hydrogenated methylene diphenylene diisocyanates; and aromatic diisocyanates such as the toluene diisocyanates, particularly the 2,4-isomer, the methylene diphenylene diisocyanates, particularly 4,4'-methylene diphenylene diisocyanate (4,4'-MDI), tetramethylxylylene diisocyanate, and the like. Less preferred aromatic diisocyanates include the polymethylene polyphenylene polyisocyanates having functionalities greater than two. Also preferred are modified diisocyanates prepared by reacting one or more diisocyanates with themselves, or with a low molecular weight isocyanate reactive compound to form urea-modified, urethane-modified, carbodiimide-modified, allophanate-modified, uretonimine-modified, biuret-modified, and other modified isocyanates, many of which are commercially available. Particularly preferred is 4,4'-MDI.

A critical component of the spandex elastomer of the subject invention is the polyol component used to prepare the isocyanate-terminated prepolymer. This polyol component must comprise one or more high molecular weight, ultra-low unsaturation polyoxypropylene polyols. The unsaturation of the high molecular weight polyol component is critical. This polyol component must comprise, in most major part, i.e., at least 70 weight percent based on the weight of the high molecular weight polyol component, of an ultra-low unsaturation polyoxypropylene polyol. Most preferably, the entire high molecular weight polyol component has an unsaturation of less than 0.010 meq/g, more preferably less than 0.007 meq/g, and most preferably about 0.005 meq/g or lower. However, it would not depart from the spirit of the invention to include a minor portion of high molecular weight polyoxypropylene polyol which has a somewhat higher unsaturation, for example, but not by way of limitation, up to about 30 weight percent of a polyoxypropylene polyol having an unsaturation of about 0.015 to 0.020 meq/g. In such cases, the actual unsaturation of the high molecular weight polyol component should still be about 0.010 meq/g or lower. However, as long as the most substantial part, i.e., 70 weight percent or more, of the high molecular weight polyol component comprises an ultra-low unsaturation polyoxypropylene diol, the beneficial results of the invention may be obtained.

Thus, by the term "ultra-low unsaturation polyoxypropylene glycol," is meant a polymer glycol prepared by oxypropylating a dihydric initiator with propylene oxide in the presence of a catalyst such that the total unsaturation of the polyol product is less than 0.010 meq/g. Preferably, the catalyst is a double metal cyanide catalyst such as those disclosed in U.S. Pat. Nos. 5,470,813 and 5,482,908. Through the use of the catalyst disclosed in these references, unsaturations in the range of 0.004 to 0.008 are routinely achieved. The polyoxypropylene glycol may contain oxyethylene moieties distributed randomly or in block fashion. If the oxyethylene moieties are contained in a block, the block is preferably a terminal block. However, randomly distributed oxyethylene moieties are preferred when such moieties are present. In general, the polyoxypropylene glycol should contain about 30 weight percent or less of oxyethylene moieties, preferably 20 percent or less, and more preferably about 10 percent or less. The polyoxypropylene glycol may also contain higher alkylene oxide moieties such as those derived from 1,2- and 2,3-butylene oxide and other higher alkylene oxides, or oxetane. The amount of such higher alkylene oxides may be as much as 10–30% by weight of the polyoxypropylene polyol. However, preferably, the polyoxypropylene polyol is substantially derived from propylene oxide or propylene oxide in admixture with minor amounts of ethylene oxide. All such glycols containing a major portion of oxypropylene moieties are considered polyoxypropylene glycols as that term is used herein.

The high molecular weight, ultra-low unsaturation polyoxypropylene glycol has a molecular weight greater than 2000 Da, preferably at least about 2500 Da, and may range up to 20,000 Da or higher. Preferably, the molecular weight is in the range of 3000 Da to 10,000 Da, and more preferably in the range of 3000 Da to 8000 Da. A range of 4000 Da to 8000 Da is also a preferred range. Molecular weights and equivalent weights herein are number average molecular weights and equivalent weights unless specified otherwise. It is possible to use a blend of more than one high molecular weight polyoxypropylene polyol, or to add low molecular weight diols in minor quantity. However, when such blends are used, the average molecular weight of the blend of high molecular weight components should be at least 2000 Da and otherwise within the ranges previously stated. The polyoxypropylene glycol component further may include minor amounts of higher functionality polyols, particularly polyoxypropylene triols and polyoxypropylene tetrols which may be advantageously added to adjust the viscosity or the spinnability of the prepolymer or prepolymer solution. Preferably, the fibers are prepared from substantially all difunctional polyols, i.e., polyoxypropylene glycol-derived. The term "polyoxypropylene glycol" as used herein includes a minor amount, i.e., up to about 20 weight percent or more of a high molecular weight, ultra-low unsaturation triol or tetrol, particularly in the case of reaction spinning as discussed hereafter.

The high molecular weight, ultra-low unsaturation polyoxypropylene glycol is reacted with an excess of the desired diisocyanate, preferably under a nitrogen atmosphere at slightly elevated temperature, i.e., between 50° C. and 100° C., more preferably between 60° C. and 90° C. The amount of excess isocyanate is selected so as to provide a % NCO group content in the prepolymer of between about 0.5 weight percent and 10 weight percent, preferably between 2 weight percent and 4 weight percent. The reaction of the isocyanate with the polyol may be catalyzed with standard catalysts such as dibutyltin dilaurate, or may take place without catalysis. In general, the reaction proceeds until the point where the isocyanate content becomes constant. The isocyanate-terminated prepolymer is then generally dissolved in a polar aprotic solvent such as dimethyl acetamide, dimethyl formamide, dimethyl sulfoxide, N-methylpyrrolidone, or the like, and then chain-extended with a diamine as discussed, and as further discussed in the references cited previously. By the term "polar aprotic solvent" as used herein is meant a solvent having the capability to dissolve the chain extended polyurethane at the desired concentration while being essentially non-reactive to isocyanate groups.

The reaction spinning process accounts for a minor amount of spandex production, however, the prepolymers of the subject invention are well suited for use therein also. In reaction spinning, the isocyanate-terminated prepolymer itself is spun into strands, which are then passed into a bath containing diamine chain extender. While water solutions of aliphatic diamines have been used, it is generally more expedient to dissolve the diamine chain extender in a more volatile solvent such as toluene. Since the prepolymer itself is being spun in the reaction spinning process, prepolymer viscosity must be kept high to prevent dissipation of prepolymer into the solvent and to prevent strand breakage. To achieve the necessary high viscosity, up to about 10 weight percent of the entire polyol component of the prepolymer, preferably about 2–7 weight percent of the polyol component, may be replaced with a low molecular weight triol such as glycerine or trimethylolpropane or their lower oxyalkylated oligomers. The addition of these amounts causes a large increase in prepolymer viscosity, rendering the prepolymer spinnable.

The polymer thus obtained has both hard and soft segments. The terms "soft segment" and "hard segment" refer to specific portions of the spandex polymer chains. The soft segments are the polyether-based portions of the segmented polyurethane/urea polymer, derived from the polyoxypropylene glycol. The hard segments refer to the portions of the polymer chains that are derived from the diisocyanate and chain extender. The term "NCO content" refers to the isocyanate group content of the prepolymer, before chain extension. The term "molecular weight" means number average molecular weight unless indicated otherwise. The number average molecular weights for the polyether glycols are each determined from the hydroxyl number of the polyether glycol as measured by the imidazolepyridine catalyst method described by S. L. Wellon et al., "Determination of Hydroxyl Content of Polyurethane Polyols and Other Alcohols", ANALYTICAL CHEMISTRY, Vol. 52, No. 8, pp. 1374–1376 (July 1980).

Suitable chain extenders include, but are not limited to, ethylene diamine, 1,3-propylene diamine, hydrazine, piperazine, tetramethylene diamine, cyclohexylene-1,3-diamine (hydrogenated m-phenylene diamine), isophorone diamine, or mixtures of these diamines. Preferred are mixtures containing ethylene diamine as the major component. Ethylene diamine as the sole chain extender is particularly preferred. Other diamine chain extenders useful in the present invention include diethyltoluene diamine, 1,4-diamino-2-methylpiperazine, 1,4-diamino-2,5-dimethylpiperazine, and methyl bispropylamine, substituted aromatic diamines such as the product commercially available as UNI-LINK 4200, a product of UOP, Inc., N,N-bis(2-hydroxypropyl)aniline commercially available as ISONOL 100, a product of Dow Chemical Corporation, and combinations thereof. The amount of aromatic diamines used, if any, should be minimal. Preferably, the entire diamine component is substantially aliphatic or cycloaliphatic. By the term "substantially aliphatic or cycloaliphatic" is meant that at least about 70 mol percent of total diamine chain extender is an aliphatic diamine and/or a cycloaliphatic diamine. Minor portions of diol chain extenders such as those traditionally used in other elastomers may be added under appropriate circumstances. Such diol chain extenders include ethylene glycol, propylene glycol, 1,4-butanediol, 1,6-hexanediol, diethylene glycol, dipropylene glycol, and the like.

Chain terminators are generally included in the reaction mixture to adjust the final molecular weight, and thus the intrinsic viscosity, of the polyurethane/urea polymer to the desired value. Usually, the chain terminators are monofunctional compounds such as secondary amines, for example diethylamine or dibutylamine, or hydroxyl or thiol functional compounds such as n-butanol or dodecanethiol. The terminator content is adjusted such that the resultant spandex polymer dissolved in a polar aprotic solvent preferably has a viscosity in the range of 100 to 10,000 poise at 25° C., preferably 150 to 5000 poise at approximately 10–50% solids, preferably 25–45% solids. The polymer should have an intrinsic viscosity in the range of 0.75 to 2.5 dL/g, preferably 1.0 to 1.8 dL/g, when measured at 25° C. in N,N-dimethylacetamide at a concentration of 0.5 grams per 100 milliliters of solution.

Having generally described this invention, a further understanding can be obtained by reference to certain specific examples which are provided herein for purposes of illustration only and are not intended to be limiting unless otherwise specified.

Procedure Used For Preparing Spandex Used in Examples

The following procedure was used to prepare the elastic polymer. Polyol was mixed with 4,4'-diphenylmethane diisocyanate (4,4-'MDI) and heated for about 8 hours at 80° C. to yield the appropriate isocyanate-terminated polyether prepolymer (i.e., isocyanate capped glycol). The prepolymer was then mixed with dimethylacetamide (DMAc) for about 2 minutes to form a solution containing about 21.3% solids. Then, while the prepolymer solution was still being mixed, a mixture of ethylene diamine (EDA) chain extender and diethylamine (DEA) chain terminator dissolved in additional DMAc was added to the isocyanate-terminated polyether prepolymer solution and the resulting reaction formed the desired segmented polyurethane/urea. The additional amount of DMAc decreased the solids concentration of the resultant solution to 20% by weight of the total solution.

Films were cast onto glass plates from the polymer solution. The films were dried and cut with a die into 0.25" wide strips. Elastic properties of spandex films were measured in general accord with the procedures described in ASTM D 2731-72. This method was designed mainly for the testing of elastic threads and yarns rather than films. However, the parameters tested by this method are those commonly used to evaluate the elastic properties of spandex. Tests were run on a constant-rate-of-extension type tensile testing machine with a load capacity of 50N (11.2 lb). The samples were gripped by pneumatically operated clamps. In order to avoid tearing at the grips, films were sandwiched between two pieces of self-fusing Okonite No. 35 jacketing Tape.

For the examples, sample strips of 0.25 inch width and 2.5 inch gauge length were cycled five times between the limits of 0 to 300% elongation. On the fifth cycle, the specimen was held in the extended state for 30 seconds before returning the crosshead. On the return cycle after holding at 300% elongation for 30 seconds, the crosshead was returned and the forces at 300, 200 and 100% elongation were recorded. By dividing the force at each of these points by the initial film cross-sectional area, the unload power or retractive power was calculated for each of these points. In order to calculate % set, 30 seconds after completion of the fifth cycle, the crosshead was slowly lowered until visible slack was just removed from the film. The extension was recorded to the nearest 0.01". Set, as calculated from the following formula, is defined as the difference between the original and final length, expressed as a percentage of the original length.

Set, in percent=[(Final Length–Initial Length)/Initial Length]* 100

Fiber or film made from spandex polymer according to the invention generally has a set of no greater than 30%.

EXAMPLE 1

Spandex Based on Polyoxypropylene Polyols: Effect of Terminal Unsaturation Content Spandex polymers of Example 1 and Comparative Examples C-1 and C-2 were prepared using 4000 MW polyoxypropylene diols (PPG) with terminal unsaturation contents of 0.0047, 0.015 and 0.058 meq/gm, respectively. These polyols were reacted with 4,4'-MDI at an NCO/OH of 2.35 to form an isocyanate-terminated prepolymer. The isocyanate prepolymer was extended with ethylene diamine (EDA) in dimethylacetamide (DMAC) solution at a 20% solids content. Films were cast on glass plates and analyzed in general accord with the procedures described in ASTM D 2731-72. A detailed description of the spandex preparation and analysis procedure is given in the section above.

TABLE 1

| Example | Polyol MW | Unsaturation Content of Polyol Blend (meq/g) | NCO/OH | % NCO | UP @ 100% (psi) | UP @ 200% (psi) | % Set | Tensile Strength (psi) | % Elongation @ Break |
|---------|-----------|-----------------------------------------------|--------|-------|-----------------|-----------------|-------|------------------------|----------------------|
| 1       | 4000      | 0.0047                                        | 2.35   | 2.28  | 145             | 313             | 24    | 4940                   | 1350                 |
| C-1     | 4000      | 0.015                                         | 2.35   | 2.51  | 92              | 258             | 40    | 1970                   | 1170                 |
| C-2     | 4000      | 0.058                                         | 2.35   | 2.22  | 68              | 197             | 43    | 640                    | 310                  |

NCO: NCO content (wt. %) of the prepolymer.
UP @ 100%: 5th cycle unload (retractive) power at 100% elongation.
UP @ 200%: 5th cycle unload (retractive) power at 200% elongation.

Figure 3:
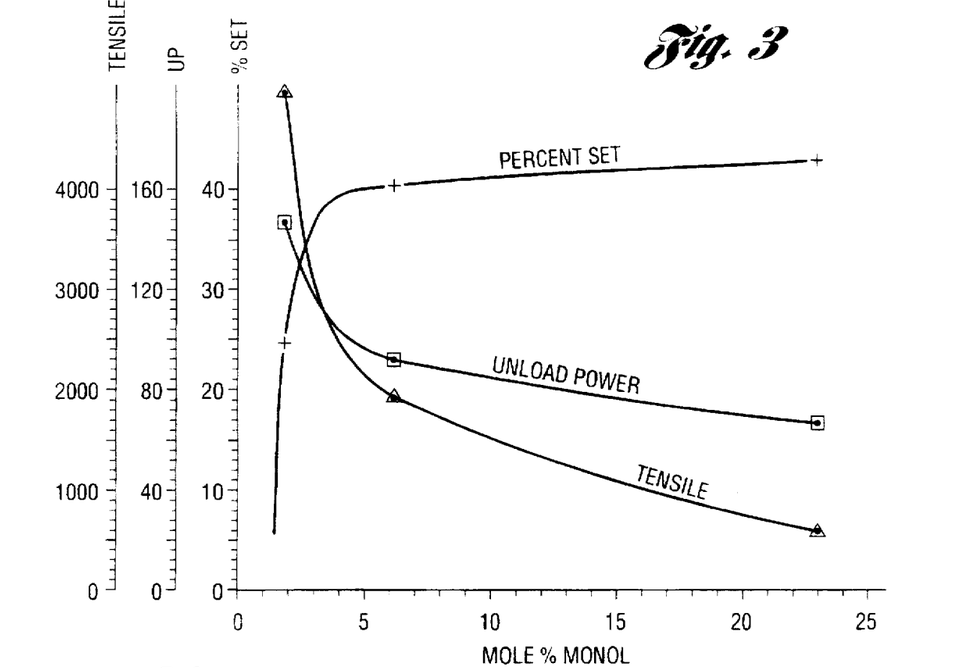
FIG. 3 illustrates the actual relationship of percent set, unload power, and tensile strength to monol content, showing the unexpected change in the relationship at an unsaturation of about 0.010 meq/g.

The results set forth in Table 1 are plotted in FIGS. 1, 2 and 3, and demonstrate conclusively the very different behavior of ultra-low unsaturation content polyoxypropylene diol-derived spandex as compared to spandex prepared from conventional diols and low unsaturation diols. In the Figures, tensile strength (TENSILE) and unload power (UP) are both reported in psi. FIG. 1 illustrates the relationship between elongation and monol content. The 0.058 meq/g conventional diol contains about 23 mol percent monol, while the low unsaturation diol (0.015 meq/g unsaturation) has only about 6% monol, and demonstrates considerably greater elongation. The ultra-low unsaturation diol results in only a slight further improvement, in elongation, 1350%, at the limit of crosshead travel. As can be seen from FIG. 1, the relationship between elongation and unsaturation appears to be inverse and linear.

FIG. 2 contains plots of tensile strength, unload power, and percent set against monol content. While high tensile strength and unload power are desirable, from a commercial standpoint, a low percent set is also critical. The low unsaturation diol gave only very modest improvements in any of these physical properties as compared to the conventional diol. Extrapolating in linear fashion to lower levels of unsaturation, as shown by the dotted lines, only minimal improvement should be expected from ultra-low unsaturated diols.

However, as indicated by FIG. 3, the subject invention spandex elastomers prepared from ultra-low unsaturation diols provided highly unexpected, totally non-linear behavior as compared to even low unsaturation diols. For example, while unload power increased by 50%, tensile strength more than doubled, increasing from 1970 psi to 4940 psi. Especially noteworthy is the reduction in percent set from 40 (very unacceptable) to 24, a commercially acceptable value. These effects could not be predicted based on the behavior of low unsaturation diols.

EXAMPLE 2

Spandex Based on Polyoxypropylene Polyols: Effect Of PPG Molecular Weight

Table 2 shows the effect of the ultra-low unsaturation polyol molecular weight on the spandex properties. Surprisingly, it has been found that a polyol molecular weight of greater than 2000 Da (Comparative C-3) is required to achieve a percent set of 30 or less. This is particularly surprising considering the fact that the spandex industry currently uses PTMEG in a molecular weight range of 1500 to 2000 Da.

curve as shown in FIG. 4 at 1. The difference in stress-strain properties between the stretching and retraction portions of a given test cycle forms a hysteresis loop. The area 2 bounded by the load 3 and unload curves 1 can be used to quantify the degree of hysteresis in a film, fiber, yarn or fabric. A larger hysteresis loop or energy loss implies heat generation and thus discomfort in wear.

TABLE 2

| Example | Polyol* MW | Unsaturation Content of Polyol (meq/gm) | NCO/OH | % NCO | UP @ 100% (psi) | UP @ 200% (psi) | % Set |
|---------|------------|------------------------------------------|--------|-------|-----------------|-----------------|-------|
| C-3     | 2000       | 0.0047                                   | 1.7    | 2.32  | 124             | 314             | 37    |
| 2       | 3000       | 0.005                                    | 1.7    | 1.62  | 119             | 254             | 26    |
| 3       | 4000       | 0.005                                    | 1.7    | 1.22  | 116             | 226             | 20    |
| 4       | 8000       | 0.005                                    | 1.7    | 0.75  | 72              | 135             | 18    |

*2000, 4000 and 8000 MW polyols are polyoxypropylene diols, and the 3000 MW polyol is a polyoxyethylene-oxypropylene copolymer diol which contains 10 weight percent of random internal oxyethylene moieties.

EXAMPLE 3

Spandex Based On Polyoxypropylene Polyols: Comparison to Polytetramethylene Ether Glycol (PTMEG)

Table 3 and FIG. 4 compare spandex based on ultra-low unsaturation polyoxypropylene polyols according to the invention to a spandex based on a 2000 Da molecular weight polytetramethylene ether glycol (PTMEG-2000) which is considered the "standard of the industry."

Spandex made according to the invention using a 4000 Da molecular weight ultra-low unsaturation polyoxypropylene diol has dramatically higher elongation than the comparative spandex based on PTMEG-2000 (C-4). Example 5 has an elongation at break of 1350%, while values of 450–600% are usually reported for PTMEG-based spandex. A higher elongation at break dramatically increases the energy required to break the fiber. Breakage of the spandex during either the fiber and textile manufacturing process causes major problems in terms of fiber productivity and textile production. So a fiber with a higher energy to break would be considered advantageous by the spandex manufacturers and the textile industry.

Spandex based on ultra-low unsaturation B polyoxypropylene glycol also gave dramatically lower hysteresis over that based on PTMEG-2000. Hysteresis is a measure of the energy loss during stretching and retraction of an elastic material. When a film or fiber is extended on the testing machine and the direction of crosshead travel is reversed to record the retraction, the unload curve falls below the load Example 5 prepared according to the invention exhibited approximately three times less hysteresis than Comparative C-4. The % set values of Example 5 are comparable to C-4. The hysteresis is plotted in Figure 4 at 4.

Spandex based on ultra-low unsaturation polyoxypropylene glycol has the advantages of the high elongation and lower hysteresis of rubber with the advantages of the ease of processability to fine denier fibers of PTMEG-based spandex.

TABLE 3

| Example | Polyol | Polyol MW | Unsaturation Content of Polyol (meq/gm) | NCO/OH | % NCO | UP @ 100% (psi) | UP @ 200% (psi) | % Set | Area |
|---------|--------|-----------|------------------------------------------|--------|-------|-----------------|-----------------|-------|-------|
| C-4     | PTMEG 2000 | 2000 | 0 | 1.7 | 2.30 | 235 | 336 | 20 | 47100 |
| 5       | 4000   | 4000      | 0.005                                    | 2.35   | 2.28  | 145             | 313             | 24    | 13500 |

Area = Area between the load and unload curves (psi* %) - indicates the amount of hysteresis.

EXAMPLE 4

Spandex Based on Polyoxypropylene Polyol Using Isocyanate Mixtures

Table 4 below shows two spandex formulations prepared according to the invention utilizing a mixture of diisocyanates instead of only 4,4'-diisocyanato-diphenylmethane (4,4'-MDI). Example 6 contains 20 equivalent percent of isophorone diisocyanate (IPDI) and Example 7 contains 20 equivalent percent of 2,4'-diisocyanato-diphenylmethane (2,4'-MDI). Example 6 was prepared at a 30% solids content instead of a 20% solids content. The film properties are excellent as indicated by the low percent set and high elongation at break values.

TABLE 4

| Example | PPG Polyol MW* | Isocyanate | NCO/OH | % NCO | UP @ 100% (psi) | UP @ 300% (psi) | % Set | Tensile Strength (psi) | % Elongation at Break |
|---|---|---|---|---|---|---|---|---|---|
| 6 | 4000 | 80% 4,4'-MDI 20% IPDI** | 2.35 | 2.35 | 119 | 389 | 14 | >4400*** | >1350*** |
| 7 | 4000 | 80% 4,4'-MDI 20% 2,4'-MDI | 2.35 | 2.38 | 121 | 512 | 18 | >2000*** | >1350*** |

*4000 = 4000 mw polyoxypropylene diol (unsaturation content = 0.005 meq/gm).
**IPDI = isophorone diisocyanate.
***Did not break at limit of crosshead travel.

EXAMPLE 5

Spandex Based on Polyoxypropylene Polyol Using Amine Extender Mixtures

Table 5 presents physical properties of a spandex formulation prepared according to the invention utilizing a mixture of diamines instead of only ethylene diamine (EDA). Example 8 contains 20 percent equivalents of 1,2-propane diamine (PDA). The film properties are excellent as indicated by the low percent and high elongation at break.

Another advantage is the viscosity of the polymer solutions. The table includes a comparison of the viscosity of polymer solutions (20% solids in DMAC) prepared according to the invention versus a comparative example based on PTMEG. The polymer solutions prepared according to the invention have dramatically lower viscosities than those based on PTMEG-2000. Polymer solution viscosity is normally a direct function of the weight average molecular weight. However, the weight average molecular weights of the polymer solution of the Example 2 prepolymer is even

TABLE 5

| Example | PPG Polyol MW* | Chain Extender | NCO/OH | % NCO | UP @ 100% (psi) | UP @ 300% (psi) | % Set | Tensile Strength (psi) | % Elongation at Break |
|---|---|---|---|---|---|---|---|---|---|
| 8 | 4000 | 80% EDA 20% PDA** | 2.35 | 2.30 | 120 | 566 | 24 | >4700*** | >1350*** |

**PDA = 1,2-propanediamine
***Did not break at limit of crosshead travel

EXAMPLE 6

Lower Prepolymer and Polymer Solution Viscosities Using Ultra-Low Unsaturation Polyoxypropylene Polyols In addition to advantages in the polymer properties highlighted above, there are also surprising processing advantages with both the isocyanate prepolymer and the polymer solutions. Table 6 below highlights the advantage in prepolymer viscosities of samples prepared according to the invention versus a comparative example prepared with PTMEG at equivalent NCO/OH ratios. Surprisingly, Example 2 had a prepolymer viscosity roughly eight times lower than the Comparative C-4 based on PTMEG-2000.

Lower viscosity greatly enhances the ease of prepolymer production and in processing the prepolymer into the polymer solution prior to fiber manufacture.

higher than that of the Comparative C-4 prepolymer based on PTMEG-2000. This unexpected development will allow production of polymer solutions at a higher solids content which translates to higher throughput during the fiber spinning step. The removal of solvent (DMAc) is the rate limiting step in terms of the speed of fiber production. Higher polymer solids content means a lower solvent content, which in turn means less solvent to remove during fiber spinning and a faster rate of production. In addition, energy costs may be reduced as well.

TABLE 6

| Example | Polyol(s) | Unsaturation Content of Polyol (meq/gm) | NCO/OH | % NCO | Prepolymer Viscosity (cps @ 60° C.) | Prepolymer Viscosity (cps @ 80° C.) | Polymer Solution Viscosity (cps @ 25° C.) | Polymer Weight Average MW** |
|---|---|---|---|---|---|---|---|---|
| C-4 | PTMEG-2000 | 0 | 1.7 | 2.30 | 54,300 | 21,400 | 30,000 | 362,000 |
| 2 | 3000* | 0.005 | 1.7 | 1.62 | 6,200 | 2,600 | 14,400 | 467,000 |

*A polyoxyethylene-oxypropylene copolymer diol containing 10 weight percent of random internal oxyethylene moieties
**Polymer molecular weights were determined by gel permeation chromatography (GPC) using a Waters GPC equipped with a Waters Model 510 HPLC Pump and a Waters 410 Differential Refractometer. The samples were analyzed versus polymethylmethacrylate (PMMA) standards on a Styragel ® column using N,N-dimethylformamide at 50° C.

Having now fully described the invention, it will be apparent to one of ordinary skill in the art that many changes and modifications can be made thereto without departing from the spirit or scope of the invention as set forth herein.

What is claimed is:

1. A spandex elastomer prepared by the process of:
   a) selecting an isocyanate-terminated prepolymer prepared by reacting a stoichiometric excess of one or more di- and/or polyisocyanates with a polyoxypropylene diol component having a molecular weight in excess of 2000 Da and an unsaturation of about 0.010 meq/g or less, said polyoxypropylene diol component comprising about 70 weight percent or more based on the weight of the diol component, of one or more ultra-low unsaturation polyoxypropylene diols having an unsaturation of less than about 0.010 meq/g, and a molecular weight of about 2500 Da to about 20,000 Da, said isocyanate-terminated prepolymer having an isocyanate group content of from about 0.5 weight percent to about 10 weight percent;
   b) preparing a solution of said isocyanate-terminated prepolymer in an aprotic solvent;
   c) chain extending said isocyanate-terminated prepolymer with a substantially aliphatic and/or cycloaliphatic diamine component to form a segmented polyurethane/urea elastomer.

2. The elastomer of claim 1 wherein at least one of said one or more ultra-low unsaturation polyoxypropylene diols has an unsaturation of less than about 0.007 meq/g.

3. The elastomer of claim 1 wherein said one or more ultra-low unsaturation polyoxypropylene diol(s) has/have a number average molecular weight of from about 3000 Da to about 8000 Da.

4. The elastomer of claim 1 wherein said segmented polyurethane/urea has a percent set of less than about 30 percent.

5. The elastomer of claim 4 wherein said segmented polyurethane/urea has a tensile strength greater than 3000 psi.

6. The elastomer of claim 1 wherein said aliphatic diamine comprises ethylene diamine.

7. The elastomer of claim 1 wherein said polyoxypropylene diol component has an unsaturation of less than 0.010 meq/g.

8. The elastomer of claim 1 wherein said aliphatic and/or cycloaliphatic diamine comprises a mixture of ethylene diamine and at least a further aliphatic diamine and/or cycloaliphatic diamine.

9. The elastomer of claim 1 wherein said segmented polyurethane/urea elastomer has a percent set of less than 30 percent, a tensile strength in excess of 3000 psi, and an elongation of greater than 900%.

10. The elastomer of claim 1 wherein said isocyanate-terminated prepolymer has an isocyanate group content of from about 2 to about 4 weight percent.

11. A spandex elastomer prepared by the process of:
    a) selecting an isocyanate-terminated prepolymer prepared by reacting a stoichiometric excess of one or more di- and/or polyisocyanates with a polyoxypropylene diol component having a molecular weight in excess of 2000 Da and an unsaturation of about 0.010 meq/g or less, said polyoxypropylene diol component comprising in about 70 weight percent or more based on the weight of the diol component, of one or more ultra-low unsaturation polyoxypropylene diols having an unsaturation of less than about 0.010 meq/g, and a molecular weight of about 2500 Da to about 20,000 Da, said isocyanate-terminated prepolymer having an isocyanate group content of from about 0.5 weight percent to about 10 weight percent;
    b) preparing a solution containing one or more aliphatic diamine and/or cycloaliphatic diamine chain extender(s) dissolved in a volatile solvent;
    c) spinning said isocyanate-terminated prepolymer (a) into said chain extender solution (b) to form a chain extended spandex elastomer; and
    d) withdrawing said chain extended elastomer from said solution b).

12. A process for the preparation of a segmented polyurethane/urea spandex elastomer, comprising:
    a) selecting an isocyanate-terminated prepolymer prepared by reacting a stoichiometric excess of one or more di- and/or polyisocyanates with a polyoxypropylene diol component having a molecular weight in excess of 2000 Da and an unsaturation of about 0.010 meq/g or less, said polyoxypropylene diol component comprising in about 70 weight percent or more based on the weight of the diol component, of one or more ultra-low unsaturation polyoxypropylene diols having an unsaturation of less than about 0.010 meq/g, and a molecular weight of about 2500 Da to about 20,000 Da, said isocyanate-terminated prepolymer having an isocyanate group content of from about 0.5 weight percent to about 10 weight percent;
    b) preparing a solution of said isocyanate-terminated prepolymer in an aprotic solvent;
    c) chain extending said isocyanate-terminated prepolymer with a substantially aliphatic and/or cycloaliphatic diamine component to form a segmented polyurethane/urea elastomer.

13. The process of claim 12 wherein at least one of said one or more ultra-low unsaturation polyoxypropylene diols has an unsaturation of less than about 0.007 meq/g.

14. The process of claim 12 wherein said one or more ultra-low unsaturation polyoxypropylene diol(s) has/have a number average molecular weight of from about 3000 Da to about 8000 Da.

15. The process of claim 12 wherein said one or more ultra-low unsaturation polyoxypropylene diol(s) has/have a number average molecular weight of from about 4000 Da to about 8000 Da.

16. The process of claim 12 wherein said aliphatic diamine comprises ethylene diamine.

17. The process of claim 12 wherein said one or more di- or polyisocyanates comprise a mixture of methylene diphenylene diisocyanate and isophorone diisocyanate.

18. The process of claim 12 wherein said aliphatic and/or cycloaliphatic diamine comprises a mixture of ethylene diamine and at least a further aliphatic diamine and/or cycloaliphatic diamine.

19. The process of claim 1 wherein said segmented polyurethane/urea elastomer has a percent set of less than 30 percent, a tensile strength in excess of 3000 psi, and an elongation of greater than 900%.

20. The process of claim 12 further comprising extruding said segmented polyurethane/urea elastomer to form a spandex fiber by a process selected from the group consisting of solution dry spinning and solution wet spinning.

21. A reaction spinning process for the preparation of a spandex fiber, comprising:
    a) selecting an isocyanate-terminated prepolymer prepared by reacting a stoichiometric excess of one or more di- and/or polyisocyanates with a polyoxypropylene diol component having a molecular weight in excess of 2000 Da and an unsaturation of about 0.010 meq/g or less, said polyoxypropylene diol component comprising in about 70 weight percent or more based on the weight of the diol component, of one or more ultra-low unsaturation polyoxypropylene diols having an unsaturation of less than about 0.010 meq/g, and a molecular weight of about 2500 Da to about 20,000 Da, said isocyanate-terminated prepolymer having an isocyanate group content of from about 0.5 weight percent to about 10 weight percent;

b) preparing a solution containing one or more aliphatic diamine and/or cycloaliphatic diamine chain extender (s) dissolved in a volatile solvent;

c) spinning said isocyanate-terminated prepolymer (a) into said chain extender solution (b) to form a chain extended spandex elastomer; and d) withdrawing said chain extended elastomer from said solution b).

* * * * *